Patented Dec. 30, 1941

2,268,324

UNITED STATES PATENT OFFICE 2,268,324

PROCESS FOR THE PREPARATION OF PHOTOGRAPHIC BLEACHING-OUT LAYERS

André Polgár and Charles Halmos, Paris, France

No Drawing. Application March 16, 1939, Serial No. 262,284. In France March 16, 1938

3 Claims. (Cl. 95—7)

It is known to use, for accelerating the photographic bleaching-out of organic dyestuffs, compounds which are known under the name of sensitizers, such as the sulphocarbamic derivatives and namely the substituted derivatives of allylsulpho-urea.

There have already been proposed as sensitizers certain bodies formed by the action of isosulphocyanates on amino-alcohols, in order to increase the field of choice of sensitizers which were employed in the usual processes.

On the other hand, it is known to increase the sensitizing power of the derivatives of the alkylsulpho-ureas, of the similar derivatives of the sulpho-semicarbazide and generally speaking of all the sulpho-carbamic derivatives, i. e. thioureas, by blocking by substitution the free valences of the nitrogen atoms occupied by hydrogen and in thus concentrating the activity of the hydrogen atoms which have remained free. However, in effecting these substitutions upon the respective molecules, their solubility in water is thereby reduced. The increase of sensitizing activity and the reduction of solubility in the water run parallel and gradually, that is to say that the more a derivative is active, the less the same is soluble in water. In using the derivatives as known heretofore, one is bound to make use of an organic solvent when it is desired that the photographic layer shall have a sufficient solubility for practical purposes. Moreover, in every particular case, one is limited to those of the bleaching-out dyestuffs which are soluble in the same solvent in which the sensitizer is dissolved, to a binding agent soluble in the organic solvents (cellulosic esters for example) and to a specially prepared carrier which is impervious to the corresponding solvent.

According to our invention, it has been found that compounds which are particularly suitable for being used as sensitizers are obtained when there are introduced into the above mentioned derivatives one or more organic groups having the property of alcohol, that is to say containing at least one hydroxyl group, to give in this manner to the derivatives a large value of solubility in water.

Such compounds may be represented by the following formula:

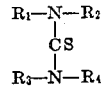

In said general formula:
$R_1$ $R_2$ $R_3$ and/or $R_4$ represent any organic radicals, such as the alkyl-, aryl-, alkylenyl-, acyl-groups, or hydrogen.

$R_1$ $R_2$ $R_3$ and/or $R_4$ may represent the group

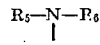

$R_5$ and/or $R_6$ representing any organic radicals.

$R_1$ and $R_2$ or $R_3$ and $R_4$ may together represent an heterocyclic nucleus.

One at least of the radicals $R_1$ $R_2$ $R_3$ and/or $R_4$ must compulsorily be a nonsaturated group, and at least one of them must be hydroxylated group.

It is necessary to remark that the substituted allyl-sulfo-ureas which contain only one OH group are not sufficiently soluble to be removed from the layer by fixation with water.

As examples of sensitizers for photographic bleaching-out layers according to the present invention, the following families of sensitizers may be mentioned:

Derivatives of sulpho-urea, derivatives of hydrazine, derivatives of sulphocarbazide, derivative of semisulphocarbazide, derivatives containing several hydroxylic groups, several hydroxylated groups, hydroxylic and/or nonsaturated groups on the heterocyclic base, hydroxyl group contained in acid group (for example a sulphonic or carboxylic one).

The simplest compound collecting together the required qualities as a sensitizer is the N-oxethyl-N'-allyl-sulpho-urea. The same may be prepared for example by means of colamine and allyl-isosulphocyanate; after cooling, what is obtained is a crystallized compound which is easily soluble in water and which distinguishes itself by its sensitizing properties.

Other compounds which constitute good sensitizers, soluble in water, are for instance an N mono or di (βoxyalkyl) - N' alkylenyl - sulpho-urea, which contain but one hydrogen namely in the vicinity of alkylenyl, the derivatives of sulpho-urea the nitrogen of which not carrying the olefinic radical is gathered together on a group of piperidine or oxypiperidine, the N-diethanol-N'-allyl-sulpho-urea, and the like.

There may further be gathered with the central atom of carbon a large number of aminoalcohols, such as the mono and the di- (βoxy-alkyl) - amines or even the mono- and di- (polyoxyalkyl)-amines or other aminated compounds containing hydroxyl groups, as for example the tyramine, the mono- or poly-alkylated hydrazines with one more hydroxyl groups in the chains. The other valence of the central carbon may be occupied by the same or other groups containing olefinic linkages.

For the purpose of obtaining the new compounds corresponding to said general formula and complying with the above enumerated conditions, it is possible to employ the known methods for the preparation of the sulpho-ureas. For example, the isosulphocyanate may be caused to react with the aminoalcohols or with the oxyalkylhydrazines. In most cases, the reaction begins instantaneously and the new compound forms itself by molecular transposition accompanied by evolution of heat.

Hereinafter will be given some examples of preparation of compounds according to the invention, capable of acting as active sensitizers which are soluble in water.

*First example.*—The solution for the bleaching-out layer is prepared in dissolving 1 part of the basic bleaching-out dyestuffs in 2 parts of hydrochloric acid and 100 parts of water containing 2% of gelatin. Finally, 15 parts of N-di-oxyethyl-N' allylsulpho-urea.

*Second example.*—0,5% of Nil-blue sulphate are dissolved in water and 5% of N-bis-(βγ-dioxypropyl)-N' allyl-sulpho-urea.

*Third example.*—A bleaching-out solution similar to the one which has been indicated in the first example is prepared. Thereto are added 10% of N-β-oxyethyl-N' allyl-sulpho-urea, 3% of thiosinamine and 2% of N-allyl-N''-β-oxyethyl-semicarbazide. This is placed upon paper and exposed in the arc lamp.

*Fourth example.*—In 2000 parts of water, are dissolved 10 parts of gelatin, 6 parts of Capri-blue NO, 8 parts of chloride of methoxy-resorcine-benzeine, 4 parts of sulphate of sulpho-pyronine, 50 parts of N-lactyl-N'-cinnamyl-sulpho-urea and 70 parts of N-di-β-oxyethyl-N' allyl-sulpho-urea. 20 parts of said solution are spread over 1.25 square yard of baryted paper. The whole is exposed under a positive in colours "tripack" with an overvoltage lamp of from 6000 to 12000 lumens. The print obtained is fixed by an aqueous solution at 20% of tannic acid during 30 minutes and is then washed with water for an hour.

Contrary to the known bleaching-out layers containing usual sensitizers, the new layers exhibit in practice important advantages. On account of the solubility of the sensitizer, said layers may be treated by aqueous fixing agents. The use of an organic liquor for the purpose of eliminating the derivative not soluble in water may be avoided. The use of gelatin as a binding agent becomes possible. According to the absence of organic solvents, the surface tension of the sensitive liquors is raised and the use of an ordinary, non water proofed paper is allowed. As regards the bleaching-out process, the new layers combine and multiply the advantages of the known sensitizers which are soluble in water and of the active sensitizers as known which are insoluble in water, while surpassing them from two points of view and, accordingly, they differ essentially from the products which have been heretofore proposed for the bleaching-out process.

We claim:

1. Bleaching-out layers containing the N-diethanol-N'-allyl-thiourea.

2. A bleaching out layer containing an N-dialkanol-N'-alkylenyl thiourea.

3. A bleaching out layer containing as sensitiser tri-substituted thioureas represented by the formula

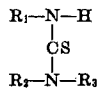

where $R_1$ is alkylenyl and $R_2$ and $R_3$ are alkanol.

ANDRE POLGÁR.
CHARLES HALMOS.